Dec. 27, 1938. J. R. ERICKSON 2,142,049
METHOD OF INCREASING THE EFFICIENCY OF RESIN BONDED GRINDING WHEELS
Filed Aug. 24, 1938
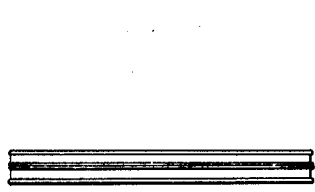
Fig.1
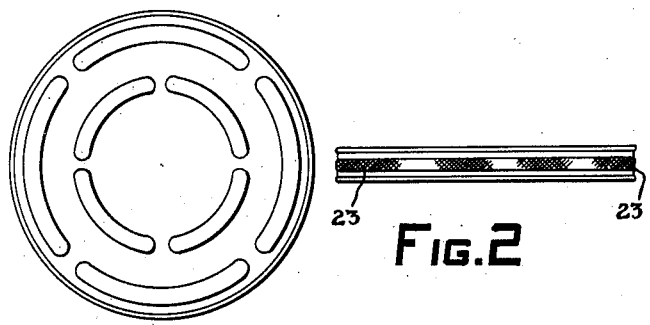
Fig.2
Fig.3
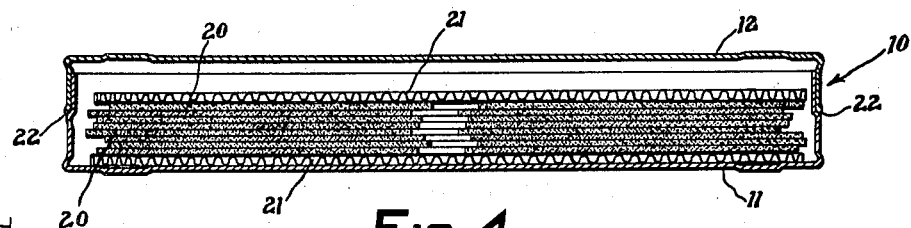
Fig.4
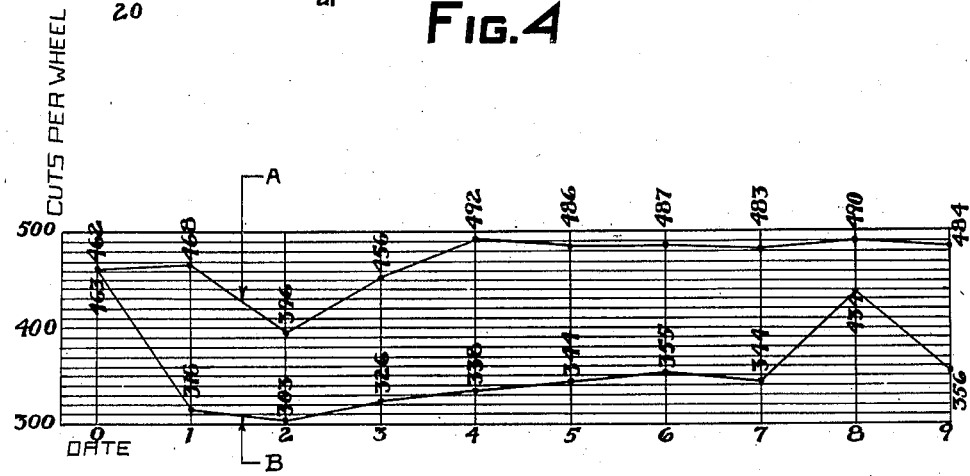
Fig.5
INVENTOR
JOHN R. ERICKSON
BY
George Crompton
ATTORNEY Patented Dec. 27, 1938

2,142,049

UNITED STATES PATENT OFFICE 2,142,049

METHOD OF INCREASING THE EFFICIENCY OF RESIN BONDED GRINDING WHEELS

John R. Erickson, Worcester, Mass., assignor to Norton Company, Worcester, Mass., a corporation of Massachusetts Application August 24, 1938, Serial No. 226,424

1 Claim. (Cl. 51—278)

The invention relates to resin bonded grinding wheels and involves a method for increasing their efficiency. One object of the invention is to prevent deterioration of synthetic resin bonded grinding wheels. Another object of the invention is to secure an actual net increase in the efficiency and/or life of such a wheel. Other objects will be in part obvious or in part pointed out hereinafter.

The invention accordingly consists in the several steps and relation and order of each of said steps to one or more of the others thereof.

In the accompanying drawing illustrating one of many possible embodiments of this invention:

Figure 1 is a side elevation of a container;

Figure 2 is a view similar to Figure 1 showing the container sealed;

Figure 3 is a plan view;

Figure 4 is an enlarged cross sectional view;

Figure 5 is a graph.

The invention is concerned particularly with resin bonded grinding wheels comprising abrasive grain bonded with a synthetic resin converted to an infusible product. For some time grinding wheels have been made by mixing a quantity of abrasive in comminuted form with unconverted polymerizable resin, then pressing and curing to convert the resin to its condensation product. For example, taking a quantity of fused alumina it is mixed with liquid stage phenol formaldehyde resin until each grain is coated with some of the resin, then solid stage but still unconverted phenol formaldehyde resin is well distributed throughout the mass. Such a mixture is then placed in a mold and pressed to produce a body, in shape a wheel, which when stripped from the mold has adequate strength for ordinary handling. This is then placed in an oven and heated at a suitable temperature, for example of the order of one hundred sixty degrees centigrade, for a number of hours until the resin polymerizes producing the final product which is infusible and sufficiently strong and tough to satisfy the requirements of a grinding wheel.

The foregoing is now understood by those skilled in the abrasive art and a detailed discussion of the manufacture of resin bonded wheels will therefore not be given. It may be noted, however, that silicon carbide or other abrasives may be substituted for the fused alumina and the abrasive grains may be wetted with a plasticizer such as furfural if desired and many variations may be made in the method of manufacturing the wheel. For instance, abrasive grains can be mixed with one hundred per cent liquid stage resin or various consistencies of resin between liquid and dry powder may be used. A hot press may be used to press and cure the mixture in a single operation or partial curing may be effected in the hot press with the final curing in an oven. Furthermore for the phenol formaldehyde may be substituted any one of the alkyd resins, which are resins formed from mixing polybasic acids with polyhydric alcohols. These are sometimes known as the glyptals. A common example is the product of glycerol and phthalic anhydride, but for the glycerol or glycerine other polyhydric alcohols could be substituted such as anhydroenneaheptitol, pentaerythritol or pentaglycerol and for the polybasic acid, citric, succinic, adipic or sebacic acids may be used. That is glyptals are likewise a condensation product, the resin mixture forming a polymer in the hardening stage which may be carried out along the lines already indicated.

Grinding wheels constituting abrasive grains bonded with polymerized synthetic resin have been made in great quantities and used for divers grinding purposes too numerous to list herein. It may be pointed out, however, that such wheels have been found particularly useful and practical when embodied in thin disks used for cutting off of metal or other substances.

Coming now to the present invention I have observed that the customers have had difficulty in duplicating results in the use of grinding wheels of the class indicated above particularly in the case of cutting-off wheels. It had been previously assumed that this failure to duplicate results was due to non-uniformity of manufacturing practice even where the utmost care was taken to keep all conditions of manufacture constant. Efforts were therefore made to control manufacture of the wheels more rigorously. I have discovered that no matter how exactly the manufacturing process is duplicated there is nevertheless decided variation in the results achieved in a customer's plant with such wheels and by my present invention I greatly reduce the variation in results and also provide a means and method whereby the customer has available for use a grinding wheel of the type above indicated which is superior to those heretofore available to him.

Referring to Figures 1 to 4 inclusive, I provide a can 10 comprising a bottom part 11 and a top or cover part 12. The bottom 11 as well as the cover 12 may be made of a single piece of metal or on the other hand it may be built up. The can preferably is made of sheet metal so that it shall be completely impervious and preferably has a coating of tin or some other metal to aluminate rust, or else it may be made of a non-corroding metal such as aluminum. For purposes of economy I prefer a tin plated sheet iron container which is commonly referred to as a tin can. The can 10 may be and in the illustrative embodiment of the invention is a motion picture film can such as is regularly used for the transmission of motion picture reels, each can holding a single reel.

I produce a quantity of grinding wheels consisting of abrasive grain bonded with polymerizable resin bond of the general class known as synthetic resins. The wheels may be made according to present known practice, which is indicated above, or in any other suitable manner. The bonding resin may be any of those heretofore mentioned or others such as aniline formaldehyde or urea formaldehyde. I intend to include within the scope of this invention the grinding wheels made from any polymerizable synthetic resin excluding the natural resins such as shellac.

In this illustrative embodiment of the invention I provide a number of wheels 20 which are thin cutting-off wheels. After the manufacture of these wheels or as an incident in the manufacture thereof I dry them for about ten hours at about one hundred ten degrees centigrade. This drying may be carried out in any suitable oven. Into the oven I also place disks of corrugated paper board 21. I now remove the wheels 20 and disks 21 from the oven and transfer them directly into the bottom part 11 and place the cover 12 in position sealing the can 10. The corrugated board 21 is protection and one disk may be placed on the bottom and one on the top as shown in Figure 4.

I then tape the joint 22 of the can 10 with ordinary surgeon's adhesive tape 23 (Figure 2). I provide some paraffin which I heat to one hundred degrees centigrade and with a paint brush I brush this paraffin on to the tape 23. When the paraffin dries this makes the joint 22 air tight.

The package is now complete and ready for shipment. By heating the wheels to drive out any moisture and by heating the other material which goes into the can 10 and by sealing the can I exclude moisture from the can and the wheels 20 are retained absolutely dry. The can 10 should not be opened until it is desired to use the wheels. I show a number of wheels in the can in Figure 4 which is a condition suited to a large manufacturing establishment which may replace a number of wheels in a single day and proceed to use them all. For smaller users it is preferred to provide shallower cans with fewer wheels. In the case of users of great numbers of wheels a larger or deeper can can be used.

Despite the fact that polymerized phenol formaldehyde appears to be a fairly dense and stable body I have discovered that there is some effect of moisture upon grinding wheels which causes their deterioration. Referring to Figure 5, I show the comparative results of drying and sealing grinding wheels in containers and failure to take precautions to keep moisture away from the wheels. In Figure 5 the ordinate represents the number of cuts which a cutting-off wheel will give before it is entirely used up, while the abscissa represents time, each number representing one week. The upper line on the graph marked A is the curve for wheels which were preserved from moisture by being packaged as above indicated while the line B is the curve for wheels which were given no such protection but were subject to the vicissitudes of changing atmospheric conditions involving changes of relative humidity as occur in a machine shop stockroom. Selecting a lot of wheels newly received from the manufacturer one half of which represented by the line A were enclosed in cans, the other half of which were not so enclosed, a can was opened and the wheels were immediately put to work and compared with the wheels which were not canned. In the case of the wheels A an average of 462 cuts per wheel was effected while in the case of unpreserved wheels B an average of 463 cuts per wheel was realized. This difference is no difference and within the limits of experimental error or actual differences in the wheels regardless of moisture and indicates that deterioration involves the time factor. One week later a second can was opened and the wheels therefrom gave 468 cuts per wheel whereas wheels which had not been guarded against humidity in any manner gave at this time only 316 cuts per wheel. At the end of the second week another package was opened and other unpreserved wheels were selected and the results indicated in the graph of Figure 5 show respectively 396 cuts per wheel and 302 cuts per wheel.

The graph of Figure 5 indicates results at still later periods. This graph shows a temporary deterioration of the preserved wheels but a recovery in their properties one week later. The graph also shows a sudden deterioration in the case of unpreserved wheels followed by a very late partial recovery which is, however, not maintained. By and large, however, wheels preserved against the effect of moisture give more cuts per wheel than unpreserved wheels at any time after the first few days subsequent to manufacture of the wheel. It may be pertinent to observe in connection with Figure 5 that the zero date is early in November placing the final date early in January so that fall and winter atmospheres affected the wheels of graph B, which atmospheres are not so humid as summer atmospheres. Undoubtedly during the summer time wheels not preserved against the effect of moisture would deteriorate still more sharply.

It will be noted from the graph of Figure 5 that as these resin wheels age there is at the outset a falling off in quality followed by an improvement in quality. In general this appears to be true of wheels whether preserved from moisture or not. I have no explanation to offer for this phenomenon but have observed the same thing in many different tests. All observations were made on phenol formaldehyde bonded grinding wheels. While a single set of tests is represented by the graph of Figure 5 I have also made a great many other tests under widely varying conditions so that I am prepared to state that the results in Figure 5 are typical and no mere accident. What reaction there may be between humid atmosphere and polymerized resin causing the deterioration noted I am not prepared to state but sealing the wheels in impervious packages quite definitely improves the quality thereof after a lapse of time as indicated.

From one aspect my invention involves a method of causing the recovery in quality of a synthetic resin bonded grinding wheel. In Figure 5 it will be observed that the wheels not guarded against moisture undergo only a partial recovery in quality after the initial falling off in quality.

It will also be observed, as above stated, that a preliminary deterioration in quality appears to be a natural incident in the life of synthetic resin bonded grinding wheels. By my method of sealing the wheels against moisture the recovery from this natural preliminary deterioration is accelerated and also carried to a higher point. In fact it will be observed that from a time four weeks after the zero date to a time nine weeks after the zero date the wheels which had been retained in cans were actually superior in quality in these same wheels when first made. On the other hand, the wheels not preserved against the effects of moisture never during the entire period of nine weeks reached the high point in performance that they originally had. A temporary recovery after the seventh week to a figure of 434 cuts per wheel was not maintained.

It will thus be seen that there has been provided by this invention a method in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

Method of increasing the life and efficiency of polymerized synthetic resin bonded grinding wheels which comprises heating the wheels immediately after manufacture thereof to a temperature that will drive out substantially all the contained moisture thereof, then sealing the wheels to prevent access of further moisture from the air or otherwise, and at a later date unsealing the wheels and using them forthwith to grind.

JOHN R. ERICKSON.